(12) United States Patent
Aarre

(10) Patent No.: US 9,523,781 B2
(45) Date of Patent: Dec. 20, 2016

(54) NORMALIZATION SEISMIC ATTRIBUTE

(71) Applicant: Schlumberger Technology Corporation, Sugar Land, TX (US)

(72) Inventor: Victor Aarre, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 404 days.

(21) Appl. No.: 14/133,271

(22) Filed: Dec. 18, 2013

(65) Prior Publication Data

US 2014/0188392 A1  Jul. 3, 2014

Related U.S. Application Data

(60) Provisional application No. 61/746,491, filed on Dec. 27, 2012.

(51) Int. Cl.
G01V 1/00 (2006.01)
G01V 1/30 (2006.01)

(52) U.S. Cl.
CPC ........... *G01V 1/301* (2013.01); *G01V 2210/64* (2013.01)

(58) Field of Classification Search
None
See application file for complete search history.

(56) References Cited

U.S. PATENT DOCUMENTS

| | | |
|---|---|---|
| 5,563,949 A | 10/1996 | Bahorich et al. |
| 5,838,564 A | 11/1998 | Bahorich et al. |
| 5,999,885 A | 12/1999 | Van Bemmel et al. |
| 2004/0071363 A1* | 4/2004 | Kouri ................. G06K 9/00516 382/276 |
| 2004/0170323 A1 | 9/2004 | Cootes et al. |
| 2008/0112649 A1* | 5/2008 | Chen ..................... G06K 9/6857 382/302 |
| 2009/0041327 A1 | 2/2009 | Chen et al. |
| 2009/0091802 A1* | 4/2009 | Brown ................. G06K 9/6256 358/466 |
| 2010/0161232 A1 | 6/2010 | Chen et al. |
| 2010/0270027 A1 | 10/2010 | Kim et al. |
| 2010/0322032 A1* | 12/2010 | Shin ....................... G01V 1/303 367/43 |
| 2011/0115787 A1 | 5/2011 | Kadlec |
| 2012/0257477 A1 | 10/2012 | Aqrawi et al. |

FOREIGN PATENT DOCUMENTS

WO    2011149609 A1    12/2011

OTHER PUBLICATIONS

Sobel Filter, http://en.wikipedia.org/wiki/Sobel_operator, accessed Nov. 6, 2015, 6 pages.

(Continued)

*Primary Examiner* — Roy Y Yi
(74) *Attorney, Agent, or Firm* — Alec J. McGinn

(57) ABSTRACT

A method can include providing seismic data values for a subsurface region that includes a reflector; determining a gradient magnitude value based on at least a portion of the seismic data values; normalizing the gradient magnitude value using a nonlinear normalization equation that includes a gradient magnitude variable divided by a normalization variable raised to a power that depends on an adjustable parameter; and outputting the normalized gradient magnitude value. Various other apparatuses, systems, methods, etc., are also disclosed.

18 Claims, 14 Drawing Sheets

(56) References Cited

OTHER PUBLICATIONS

Office Action issued in related EP application 13868601.9 on Aug. 4, 2015, 2 pages.
International Search Report and Written Opinion issued in related application PCT/US2013/076383 on Mar. 24, 2014, 10 pages.
The ITK Software Guide, Second Edition, Updated for ITK version 2.4, pp. 145-153, Nov. 21, 2005.
Chopra and Marfurt, Seismic Attributes for Prospect Identification and Reservoir Characterization, pp. 54-55, Jul. 7, 2007.
EP Application No. 13868601.9 Search Report dated Jul. 11, 2016, 4 pgs.

\* cited by examiner

NORMALIZATION SEISMIC ATTRIBUTE

RELATED APPLICATIONS

This application claims the benefit of U.S. Provisional Patent Application having Ser. No. 61/746,491, filed 27 Dec. 2012, which is incorporated by reference herein.

BACKGROUND

Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Various techniques described herein pertain to processing of data such as, for example, seismic data.

SUMMARY

A method can include providing data values for a region; determining a gradient magnitude value based on at least a portion of the data values; normalizing the gradient magnitude value using a nonlinear normalization equation that includes a gradient magnitude variable divided by a normalization variable raised to a power that depends on an adjustable parameter; and outputting the normalized gradient magnitude value. A system can include a processor; memory operatively coupled to the processor; and modules stored in the memory that comprise processor-executable instructions to instruct the system to access seismic data values for a subsurface region that includes a reflector; determine gradient magnitude values based on at least a portion of the seismic data values; normalize each of the gradient magnitude values using a nonlinear normalization equation that includes a gradient magnitude variable divided by a normalization variable raised to a power that depends on an adjustable parameter; and output the normalized gradient magnitude values. One or more computer-readable storage media can include processor-executable instructions to instruct a computing device to: access seismic data values for a subsurface region that includes a reflector; determine gradient magnitude values based on at least a portion of the seismic data values; normalize each of the gradient magnitude values using a nonlinear normalization equation that includes a gradient magnitude variable divided by a normalization variable raised to a power that depends on an adjustable parameter; and output the normalized gradient magnitude values. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
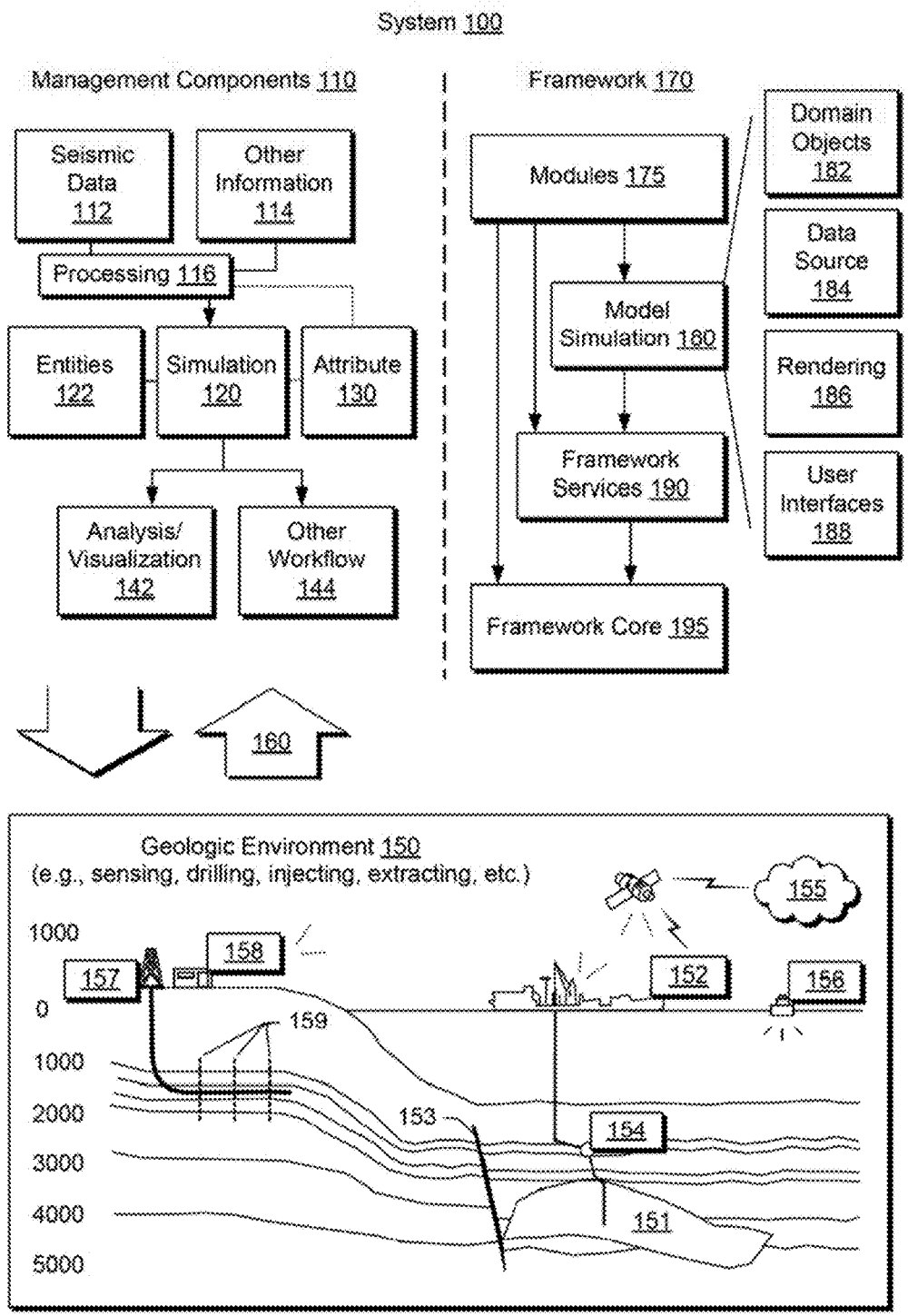
FIG. 1 illustrates an example system that includes various components for modeling a geologic environment.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

In various example embodiments, one or more nonlinear normalization analyses may be applied to data such as, for example, seismic data, data derived from seismic data, other data, etc. As an example, a method may include performing one or more nonlinear normalization analyses to detect features such as, for example, fractures, other latent structures, etc. As an example, seismic cube nonlinear normalization analyses may be implemented in a framework as a module, set of modules, etc., for example, to detect faults, fractures, and latent reflections. As an example, one or more nonlinear normalization analyses may be performed to assist with detection of one or more features of interest in oil and gas exploration and production (E&P). For example, results from an analysis may assist with well placement, geologic modeling, sill analyses, detection of fractured zones or fracture corridors, and in E&P for unconventional resources and carbonate fields (e.g., consider shale fields).

Fracture corridors or subtle faults may give rise to seismic signals that may be exhibited in acquired seismic data as small-amplitude self-incoherent features, for example, in cross sections and as lineaments on slices or seismic surfaces. Detection of such features may include processing seismic signals, seismic data or both to generate one or more edge detection attributes, for example, where an attribute may be considered a measurable 'property' of seismic data (e.g., consider amplitude, dip, frequency, phase, polarity, etc.). For example, an attribute may be a value or a set of values derived from seismic signals, seismic data, etc. and defined with respect to a coordinate system (e.g., one-dimensional, two-dimensional, three-dimensional, four-dimensional or of an even higher dimension). As an example, a dimension may be a spatial dimension, a time dimension, a frequency dimension, etc. As an example, consider providing seismic data as a "cube" where each voxel (volume element) in the cube has a value. In such an example, an edge detection algorithm may process the values in a cube to generate new values where the new values are referred to collectively as an edge detection attribute (e.g., an attribute cube).

As an example, a seismic cube (e.g., a seismic volume or seismic data for a volume) may be processed to generate an attribute cube (e.g., an attribute volume or attribute values for a volume). As another example, a seismic surface may be processed to generate an attribute surface. As yet another example, a seismic line may be processed to generate an attribute line. As an example, a seismic point may be processed to generate an attribute point.

Attributes may be derived, measured, etc., for example, at one instant in time, for multiple instances in time, over a time window, etc. and, for example, may be measured on a single trace, on a set of traces, on a surface interpreted from seismic data, etc. Attribute analysis may include assessment of various parameters, for example, as to a reservoir, consider a hydrocarbon indicator derived from an amplitude variation with offset (AVO) analysis.

As an example, structures in a subterranean environment may be understood better through acquisition of seismic data and processing of acquired seismic data. Acquired seismic data may exhibit a dynamic range of values that may be, for example, about 40 dB between weakest and strongest reflectors. Such a range of values in a data set (e.g., a seismic image, etc.) can pose issues for edge detection, which may be applied, for example, to uncover, highlight, etc. structures such as faults, fractures, etc. Various edge detection algorithms include determining gradients (e.g., spatial derivatives of values in a data set). Where dynamic range is large, gradient values too are likely to exhibit a large dynamic range. As an example, normalization may be applied in conjunction with edge detection, for example, in an effort to ensure that edges in weak reflectors may be as visible as edges in strong reflectors. As an example, a nonlinear normalization technique may be applied that includes, for example, an adjustable parameter. In various trials, such a nonlinear normalization technique demonstrated stability when applied to seismic data (e.g., raw or processed seismic data). Output values from application of such a nonlinear normalization technique demonstrated how a selected value of the adjustable parameter can help uncover and highlight structures in a subterranean environment, for example, for a particular purpose. For example, a workflow may aim to determine whether certain structures exist in a subterranean environment and whether those structures exist in some relationship with respect to other structures. In such an example, the workflow may implement a selected value of the adjustable parameter or, optionally, multiple selected values of the adjustable parameter.

As an example, a workflow may include a nonlinear normalization analysis where, based on workflow type (e.g., purpose, etc.), a predetermined parameter value may be specified for the nonlinear normalization analysis. As an example, a workflow may include nonlinear normalization analyses where, based on workflow type (e.g., purpose, etc.), one or more predetermined parameter values may be specified for the nonlinear normalization analyses.

As an example, a nonlinear normalization technique can be applied to output a more balanced edge attribute, for example, where edges for both strong and weak reflectors are detected simultaneously. Such an approach may, for example, diminish a number of procedures in a workflow compared to a workflow where weak and strong reflectors may be processed separately (e.g., where processing and visualization occur with normalization turned on and again with normalization turned off).

As an example, application of nonlinear normalization analysis or analyses to data may help to uncover, highlight, etc. small seismic data features (e.g., small in time, space or both time and space) that may be associated with faults, fractures, etc. (e.g., small seismic data features associated with seismic energy interacting with faults, fractures, etc.).

As an example, a method may include accessing or providing wellbore information, for example, to assist with selection of one or more adjustable parameter values for a nonlinear normalization technique (e.g., for use in fracture detection, etc.). As an example, fault and fracture auto tracking technology such as ant-tracking may be applied to one or more processed data sets, for example, to improve or enhance information (e.g., consider ant-tracking to generate a fracture image). As an example, detecting may include classifying, for example, where classification information (e.g. model information, results from previously analyzed data, etc.) may assist in detecting one or more features that may belong to a class of features (e.g., a type of feature).

Below, an example of a system is described followed by various technologies, including examples of techniques, which may, for example, include applying a nonlinear normalization analysis or analyses to data.

FIG. 1 shows an example of a system 100 that includes various management components 110 to manage various aspects of a geologic environment 150 (e.g., an environment that includes a sedimentary basin, a reservoir 151, one or more fractures 153, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may rely on a software framework such as an object-based framework. In such a framework, entities may include entities based on pre-defined classes to facilitate modeling and simulation. A commercially available example of an object-based framework is the MICROSOFT®.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 20 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results. As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a reservoir or reservoirs may be simulated with respect to one or more enhanced recovery techniques (e.g., consider a thermal process such as SAGD, etc.).

In an example embodiment, the management components 110 may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and that may be intersected by a fault 153. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
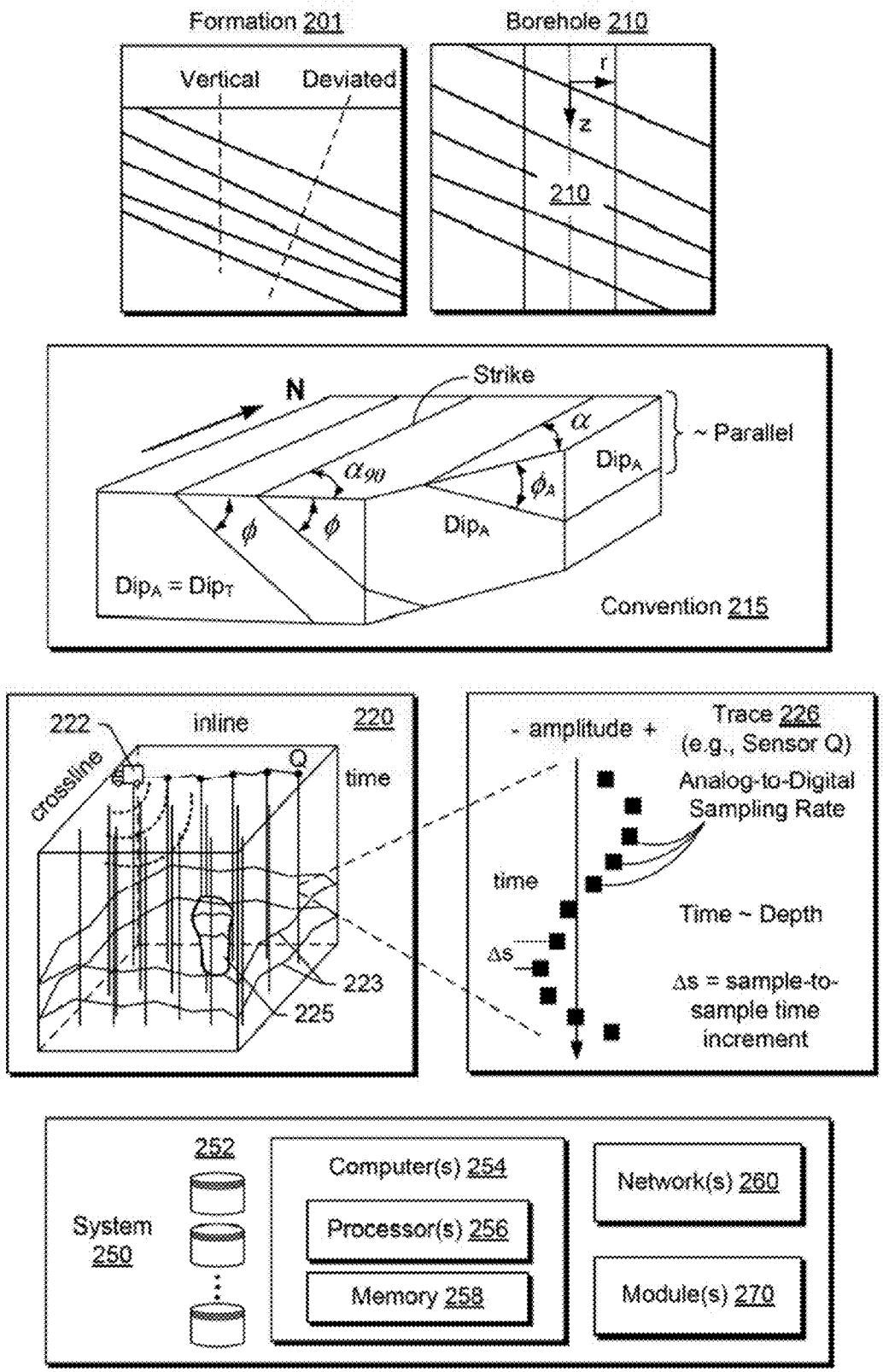
FIG. 2 illustrates examples of formations, an example of a convention for dip, an example of data acquisition, and an example of a system.

FIG. 2 shows an example of a formation 201, an example of a borehole 210, an example of a convention 215 for dip, an example of a data acquisition process 220, and an example of a system 250.

As shown, the formation 201 includes a horizontal surface and various subsurface layers. As an example, a borehole may be vertical. As another example, a borehole may be deviated. In the example of FIG. 2, the borehole 210 may be considered a vertical borehole, for example, where the z-axis extends downwardly normal to the horizontal surface of the formation 201.

As to the convention 215 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 215 of FIG. 2, various angles $\phi$ indicate angle of slope downwards, for example, from an imaginary horizontal plane (e.g., flat upper surface); whereas, azimuth refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 215 of FIG. 2). True dip is the dip of a plane measured directly perpendicular to strike (see, e.g., line directed northwardly and labeled "strike" and angle $\alpha_{90}$) and also the maximum possible value of dip magnitude, Another term is "apparent dip" (see, e.g., $Dip_A$ in the convention 215 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 215 of FIG. 2, the dip of a plane as seen in a cross-section perpendicular to the strike is true dip (see, e.g., the surface with 0 as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 215 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 215 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.).

Seismic interpretation may aim to identify and classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As shown in the diagram 220 of FIG. 2, a geobody 225 may be present in a geologic environment. For example, the geobody 225 may be a salt dome. A salt dome may be a mushroom-shaped or plug-shaped diapir made of salt and may have an overlying cap rock (e.g., or caprock). Salt domes can form as a consequence of the relative buoyancy of salt when buried beneath other types of sediment. For example, hydrocarbons may be found at or near a salt dome due to formation of traps due to salt movement in association with evaporite mineral sealing. Buoyancy differentials can cause salt to begin to flow vertically (e.g., as a salt pillow), which may cause faulting. In the diagram 220, the geobody 225 is met by layers which may each be defined by a dip angle $\phi$.

As an example, seismic data may be acquired for a region in the form of traces. In the example of FIG. 2, the diagram 220 shows acquisition equipment 222 emitting energy from a source (e.g., a transmitter) and receiving reflected energy via one or more sensors (e.g., receivers) strung along an inline direction. As the region includes layers 223 and the geobody 225, energy emitted by a transmitter of the acquisition equipment 222 can reflect off the layers 223 and the geobody 225. Evidence of such reflections may be found in the acquired traces. As to the portion of a trace 226, energy received may be discretized by an analog-to-digital converter that operates at a sampling rate. For example, the acquisition equipment 222 may convert energy signals sensed by sensor Q to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

In the example of FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g. modules), for example, executable by at least one of the one or more processors. As an example, a computer may include one or more network interfaces (e.g., wired or wireless), one or more graphics cards, a display interface (e.g., wired or wireless), etc.

In the example of FIG. 2, the one or more memory storage devices 252 may store seismic data for a geologic environment that spans kilometers in length and width and, for example, around 10 km in depth. Seismic data may be acquired with reference to a surface grid (e.g., defined with respect to inline and crossline directions). For example, given grid blocks of about 40 meters by about 40 meters, a 40 km by 40 km field may include about one million traces. Such traces may be considered 3D seismic data where time approximates depth. As an example, a computer may include a network interface for accessing seismic data stored in one or more of the storage devices 252 via a network. In turn, the computer may process the accessed seismic data via instructions, which may be in the form of one or more modules.

As an example, one or more attribute modules may be provided for processing seismic data. As an example, attributes may include geometrical attributes (e.g., dip angle, azimuth, continuity, seismic trace, etc.). Such attributes may be part of a structural attributes library (see, e.g., the attribute component 130 of FIG. 1). Structural attributes may assist with edge detection, local orientation and dip of seismic reflectors, continuity of seismic events (e.g., parallel to estimated bedding orientation), etc. As an example, an edge may be defined as a discontinuity in horizontal amplitude continuity within seismic data and correspond to a fault, a fracture, etc. Geometrical attributes may be spatial attributes and rely on multiple traces.

As mentioned, as an example, seismic data for a region may include one million traces where each trace includes one thousand samples for a total of one billion samples. Resources involved in processing such seismic data in a timely manner may be relatively considerable by today's standards. As an example, a dip scan approach may be applied to seismic data, which involves processing seismic data with respect to discrete planes (e.g., a volume bounded by discrete planes). Depending on the size of the seismic data, such an approach may involve considerable resources for timely processing. Such an approach may look at local coherence between traces and their amplitudes, and therefore may be classified in the category of "apparent dip."

As an example, imagery such as surface imagery (e.g., satellite, geological, geophysical, etc.) may be processed using a nonlinear normalization technique. As an example, a method may analyze imagery using a nonlinear normalization technique to illustrate latent structure, optionally in conjunction with non-latent structure. As an example, a framework may access surface imagery and may access sub-surface seismic data and generate a three-dimensional representation (e.g., for visualization) of surface structure and sub-surface structure, which may be joined via an interpolation process or other process. For example, a latent structure may be captured by seismology and by satellite imagery and a model constructed based at least in part on a nonlinear normalization analysis of seismic data and surface imagery.

As an example, ant-tracking may be performed as part of a workflow, which may include, for example, performing nonlinear normalization analysis on data and then generating ant track data, from which, for example, features may be extracted (e.g., patches). In turn, such features may be subject to one or more of validation, editing or other process. Ant-tracking may generate an ant-tracking attribute, an ant-tracking surface, an ant-tracking volume (e.g., or cube), etc.

Ant-tracking may include using an algorithm that by analogy, involves "ants" finding the shortest path between their nest and their food source (e.g., by communicating using pheromones to attract other ants). In such an example, the shortest path becomes marked with more pheromones than longer paths such that subsequent ants are more likely to choose the shortest path, and so on.

Where features may be latent (e.g., latent structure), for example, due to noise, acquisition footprint, etc., performing nonlinear normalization analysis prior to ant-tracking may enhance the ability to track the latent features, particularly where the features have some amount of continuity (e.g., contiguous within a surface, a volume, etc.). For example, fractures generated by a fracturing process (e.g., consider hydraulic fracturing) can tend to be relatively small (e.g., compared to faults) and contiguous.

Figure 3:
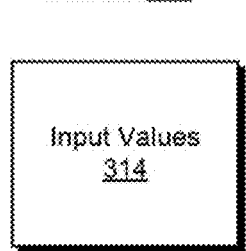
FIG. 3 illustrates examples of normalizations methods.
Figure 3:
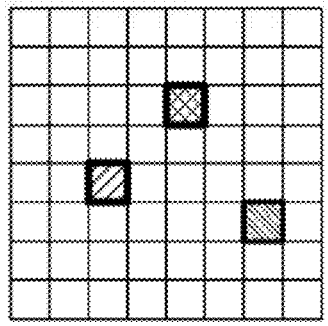
Figure 3:
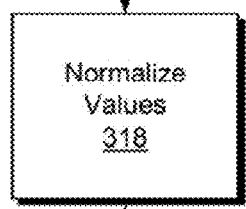
Figure 3:
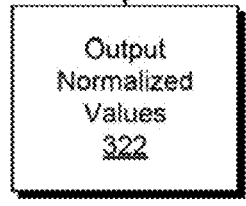
Figure 3:
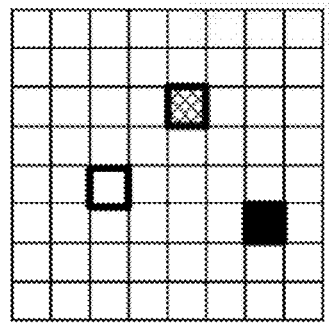

FIG. 3 shows an example of a method 310 that includes an input block 314 for inputting values, a normalization block 318 for normalizing values and an output block 322 for outputting normalized values. FIG. 3 also shows an example of an equation 330 for a linear normalization and an equation 350 for a dual parameter denominator sigmoid normalization technique.

As to the linear equation 330, for example, if a range of values of a data set is from 50 to 180 and a desired range is 0 to 255, a linear normalization technique can include subtracting 50 from each of the values, making the range from 0 to 130 followed by multiplication by 255/130 to make the range from 0 to 255.

As to the equation 350 of the sigmoid technique, it can focus on a particular range of values and progressively attenuate values outside that range. In the equation 350, I is the input value, $I_N$ is the output value, $\Delta I_{new}$ is the difference between the new minimum (also I−nmin) and maximum values, $\alpha$ defines the width of the input value range, and $\beta$ defines the value around which the range is centered.

Figure 4:
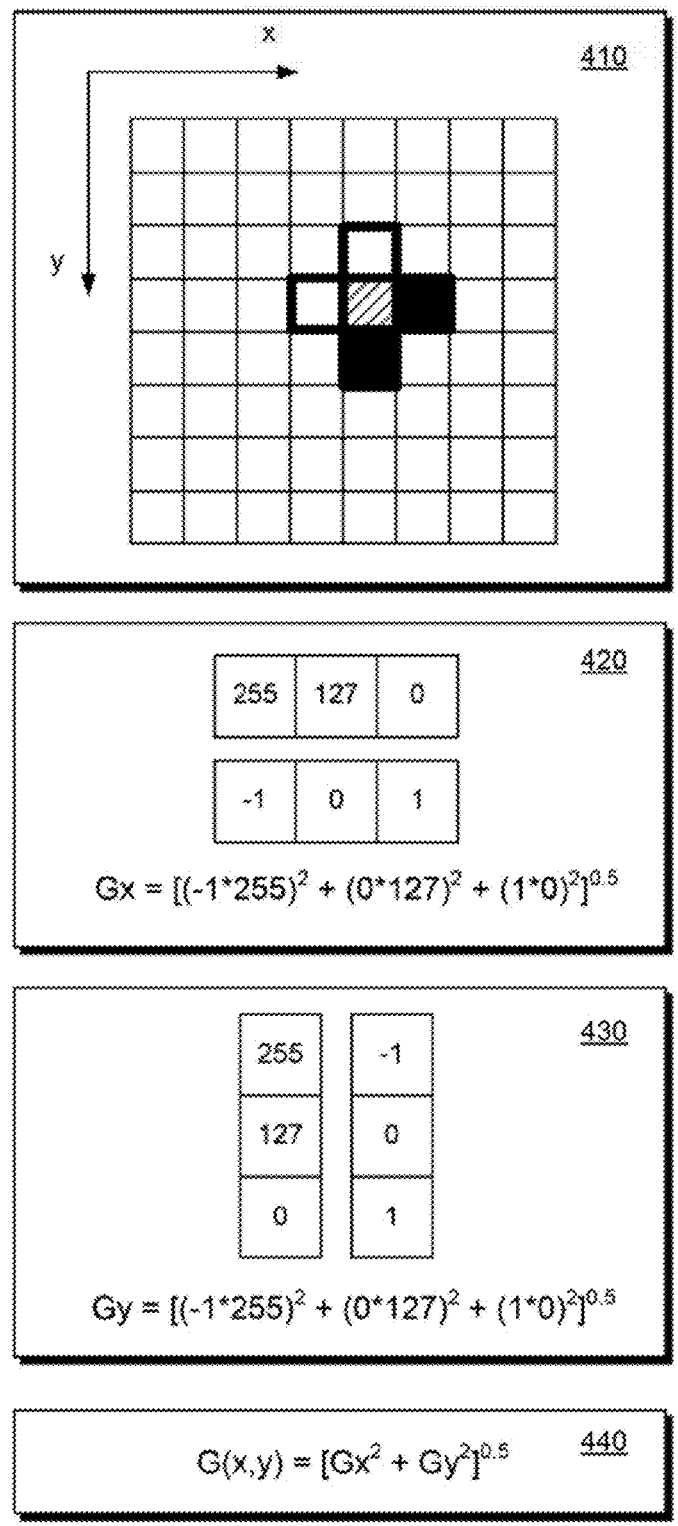
FIG. 4 illustrates an example of a gradient method.

FIG. 4 shows an example of data 410, an example of a gradient kernel 420, an example of a gradient kernel 430 and an example, of a gradient equation 440. As an example, a kernel may be implemented to convolve data Kernels find use in various types of filters. For example, consider the Sobel filter (e.g., also referred to as the Sobel operator), which includes so-called Sobel kernels. The Sobel filter finds use in edge detection. The Sobel filter is a discrete differentiation operator that can estimate the gradient of an image intensity function, for example, where at each point in the image, the result of the Sobel filter is either the corresponding gradient vector or the norm of this vector. The Sobel filter may be implemented by convolving an image with a small, separable, and integer valued operator (e.g., of several pixels in size) in horizontal and vertical directions.

As an example, the Sobel filter may include two 3×3 kernels which are convolved with an original image to estimate horizontal and vertical derivatives, which may be output as derivative images Gx and Gy. As an example, a gradient value (e.g., gradient magnitude) or gradient image may be generated based on Gx and Gy, for example, as indicated by the equation 440.

In FIG. 4, the gradient kernel 420 is shown as being a −1, 0, 1 kernel for an x-direction and the gradient kernel 430 is shown as being a −1, 0, 1 kernel for a y-direction. Examples of data values (e.g., intensity values) are shown, for example, with reference to the data 410 where values range from 0 to 255.

Figure 5:
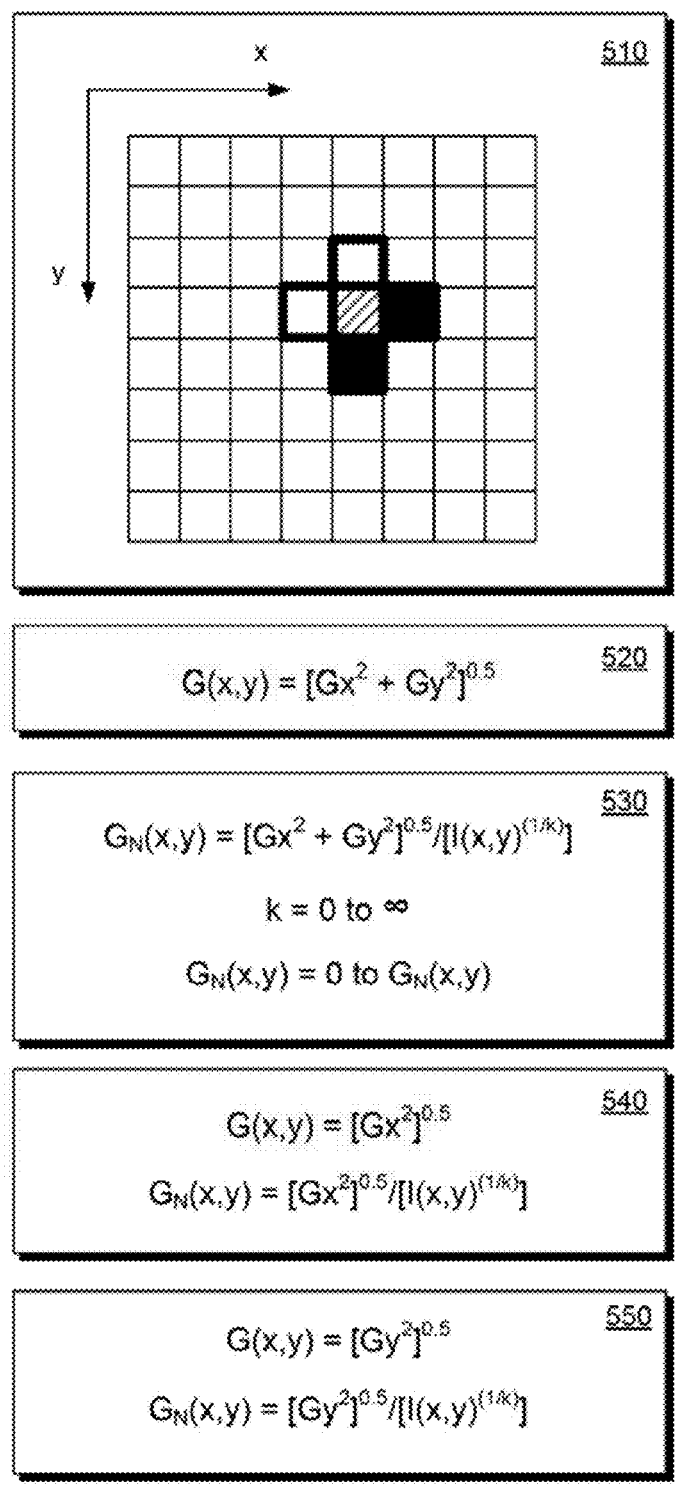
FIG. 5 illustrates examples of nonlinear normalization methods.
Figure 5:
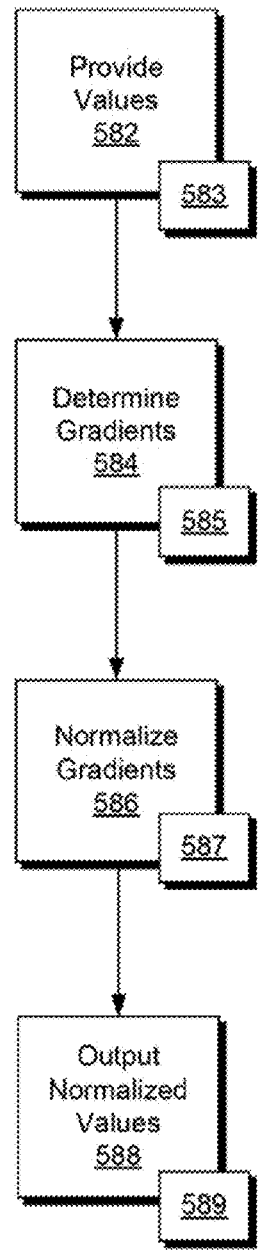

FIG. 5 shows an example of data 510, an example of a gradient magnitude equation 520, an example of a nonlinear normalization equation 530, an example of a unidirectional gradient nonlinear normalization equation 540, an example of another unidirectional gradient nonlinear normalization equation 550 and an example of a method 580.

In FIG. 5, the nonlinear normalization equations 530, 540 and 550 include a term in the denominator (e.g., a nonlinear normalization term) that includes a parameter k. In particular, the nonlinear normalization terms, in two-dimensions, may be represented by the following equation: $I(x,y)^{(1/k)}$.

In FIG. 5, the nonlinear normalization equations 530, 540 and 550 may be referred to as mixed gradient and intensity equations. For example, each of the equations includes at least one gradient value and at least one intensity value. While intensity is mentioned, it may be raw data, processed data, etc. For example, the nomenclature "I" may refer to an attribute value whereas the nomenclature G" refers to a gradient based on a plurality of attribute values.

As to the parameter k, where k is equal to 1, the nonlinear normalization equation can normalize gradient values linearly with respect to I (e.g., $I^{(1/1)}=I$); whereas, as k increases, for example, to 10, the nonlinear normalization diminishes (e.g., reaching a limit of no normalization because as the value of k increases, the term 1/k approaches zero; for example, I(x,y) raised to a power of about 0 would be approximately unity). As an example, where k=2, the nonlinear normalization may be referred to as square normalization and where k=3, the nonlinear normalization may be referred to as cubic normalization. As an example, as k approaches zero, the output may be compressed (e.g., to values less than the un-normalized gradient magnitude G). As an example, k may be a number, which may be an integer or a real number. As an example, k may be a number different than unity. As an example, k may be a number less than one. As an example, k may be a number greater than one. As an example, k may be a number less than one or k may be a number greater than one.

As shown in FIG. 5, the method 580 includes a provision block 582 for providing data values for a region: a determination block 584 for determining a gradient magnitude value based on at least a portion of the data values; a normalization block 586 for normalizing the gradient magnitude value using a nonlinear normalization equation that includes a gradient magnitude variable divided by a normalization variable raised to a power that depends on an adjustable parameter; and an output block 588 for outputting the normalized gradient magnitude value. In such an example, the data values for a region may be or include seismic data values for a subsurface region. In such an example, the subsurface region may include a reflector. For example, the seismic data values may be values based at least in part on energy reflected from a reflector (e.g., a subsurface structure, etc.).

As an example, the method 580 may include providing data values for a region where the data values are or include imagery data values. As an example, imagery data values may be X-ray, NMR, microwave, etc. or other imagery data values. As an example, data values may be acquired via satellite equipment. As an example, satellite equipment may be configured to acquire data in one or more a visible, a panchromatic, a mid-infrared, a thermal infrared or other region of an electromagnetic spectrum (e.g., consider LANDSAT data and/or other types of satellite data). As an example, data values may include information as to climate (e.g., temperature, wind, water currents, clouds, rain, snow, ice, etc.). As an example, data values may be acquired using one or more remote-sensing technologies (e.g., radar, etc.). As an example, data values may be or include data values acquired via a sensor array or sensor arrays (e.g., as in a camera, X-ray detector, etc.). As an example, a method may include detecting one or more edges in imagery data.

The method 580 of FIG. 5 is shown as being associated with various computer-readable media (CRM) blocks 583, 585, 587 and 589. Such blocks generally include instructions suitable for execution by one or more processors (or processor cores) to instruct a computing device or system to perform one or more actions. As an example, a single medium may be configured with instructions to allow for, at least in part, performance of various actions of one or more of the method 580. As an example, a computer-readable medium (CRM) may be a computer-readable storage medium (e.g., a non-transitory medium).

Figure 6:
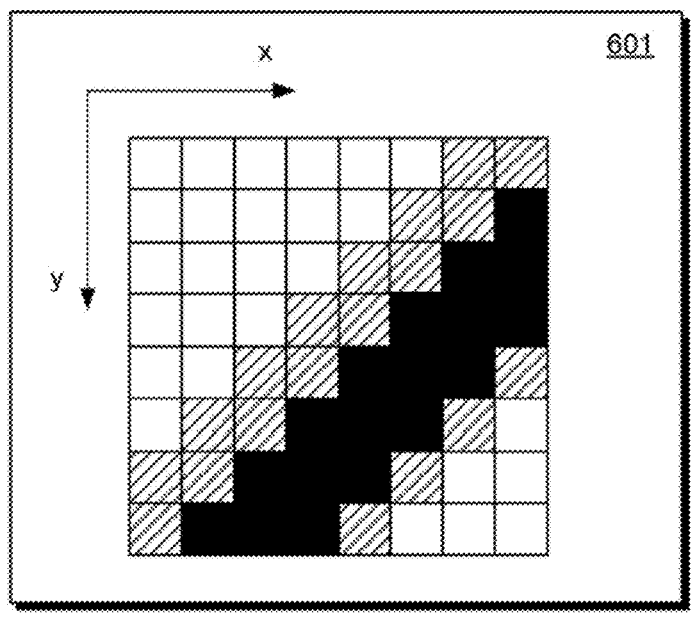
FIG. 6 illustrates examples of methods.
Figure 6:
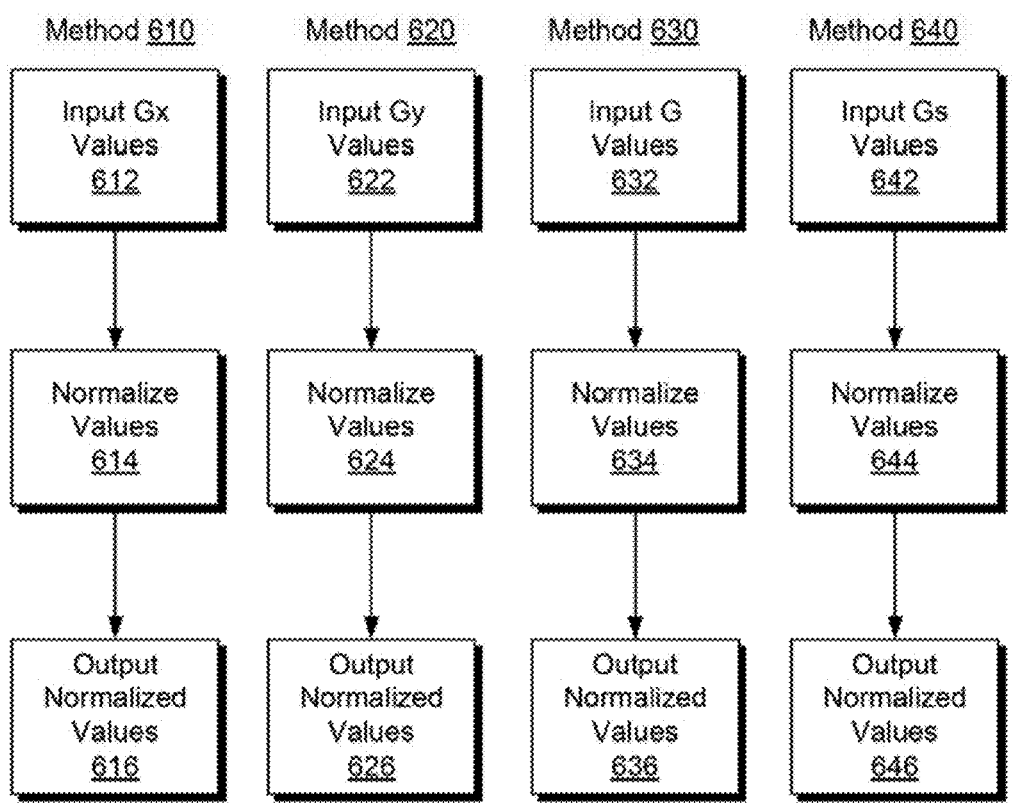

FIG. 6 shows an example of data 601 and examples of methods 610, 620, 630 and 640. The data 601 show data values where a strong gradient exists which may be an edge that traverses the spatial region (e.g. diagonally). As an example, an edge may traverse a spatial region in a particular direction while, for example, another edge may traverse the spatial region in a different direction or the same direction. In the methods 610, 620, 630 and 640, input blocks 612, 622, 632 and 642, may be selected based on information or may be selected to help uncover or highlight information, for example, as to directions of one or more edges, which may correspond to structure or structures (e.g., in a subterranean environment, an upper surface of the Earth, etc.).

As shown in FIG. 6, each of the methods 610, 620, 630 and 640 includes an input block 612, 622, 632 and 642 for inputting values, a normalization block 614, 624, 634 and 644 for normalizing values (e.g., using a nonlinear normalization equation that includes an adjustable parameter), and an output block 616, 626, 636 and 646 for outputting normalized values. As an example, input values may be gradient values and a nonlinear normalization equation may include a non-gradient value as a variable such that gradient values are normalized by non-gradient values (e.g., intensity values).

As an example, a gradient value or gradient values may be determined using a kernel or kernels that center on a spatial location, for example, where a value for that spatial location is used for normalizing a gradient value or for normalizing gradient values. For example, the equations 530, 540 and 550 of FIG. 5 can nonlinearly normalize a gradient value based on a non-gradient value (e.g., an intensity value for a spatial location).

The methods 610, 620, 630 and 640 in FIG. 6 may be associated with various computer-readable media (CRM) blocks. Such blocks generally include instructions suitable for execution by one or more processors (or processor cores) to instruct a computing device or system to perform one or more actions. As an example, a single medium may be configured with instructions to allow for, at least in part, performance of various actions of one or more of the methods 610, 620, 630 and 640. As an example, a computer-readable medium (CRM) may be a computer-readable storage medium (e.g., a non-transitory medium).

As an example, a method can include providing data values for a region; determining gradient values for at least a portion of the data values; normalizing the gradient values using a nonlinear normalization equation that comprises a seismic data value variable and an adjustable parameter term; and outputting normalized output data values. As an example, a method that includes providing data values may include accessing memory, a storage device, etc., for example, that stores such data values. For example, a processor may execute instructions that cause the processor to access data values.

As an example, output data values may optionally be enhanced via one or more processes (e.g., image processing, ant-tracking, etc.). As an example, a method can include performing ant-tracking on at least a portion of normalized output data values. As an example, a method can include outputting ant-tracking data values based at least in part on performing ant-tracking.

As an example, a region may include a subsurface region, which may include, for example, shale. As an example, a subsurface region may include or be a layer and, for example, include at least a portion of a reflector (e.g., a reflector that intersects the layer). As an example, a reflector may be a reflector of a fracture, for example, where the fracture may have been generated by a hydraulic fracturing process (e.g., optionally using proppant). As an example, a method may include performing a fracturing process on a subsurface region based at least in part on output data values from a nonlinear normalization analysis. As an example, a subsurface region may include multiple reflectors associated with artificial fractures in the subsurface region.

As an example, a method can include providing data values for a region; determining a gradient magnitude value based on at least a portion of the data values; normalizing the gradient magnitude value using a nonlinear normalization equation that includes a gradient magnitude variable divided by a normalization variable raised to a power that depends on an adjustable parameter; and outputting the normalized gradient magnitude value. In such an example, the power may be greater than or equal to 2.

As an example, a normalization variable may be one of a set of data values used for determining a gradient magnitude value. As an example, a normalization variable may be a largest magnitude data value of data values used for determining a gradient magnitude value.

As an example, an adjustable parameter may be denoted k and where a power may be $k^{-1}$. As an example, a variable may be "I" and a parameter "k" and an exponentiation $I^{(1/k)}$ (e.g., the variable I raised to a power that depends on the reciprocal of the parameter k).

As an example, a subsurface region (e.g., a subterranean environment) may include reflectors. As an example, such reflectors may include different classes of reflectors. For example, depending on reflection properties, a reflector may be classified as to how much energy it reflects, for example, along a spectrum from weak to strong.

As an example, a reflector may be an interface between layers of contrasting acoustic, optical or electromagnetic properties. In such an example, waves of electromagnetism, heat, light and sound may be reflected at such an interface. As an example, as to seismic data, a reflector might represent a change in lithology, a fault, an unconformity, etc. As an example, a reflector may be expressed as a reflection (e.g., or reflections) in seismic data.

As an example, an adjustable parameter may be selected based on at least in part on a class or classes of reflectors. As an example, reflectors may include a strong class of reflectors and a weak class of reflectors.

As an example, a method may be performed, at least in part, using a computing device, a system that includes one or more processors, etc.

As an example, a method may include repeating a determining process, a normalizing process and an outputting process, for example, to generate a multi-dimensional set of normalized gradient values. In such an example, a method may include performing ant-tracking on the multi-dimensional set of normalized gradient values.

As an example, a method may include determining a set of gradient magnitude values, applying a mean filter to the set of gradient magnitude values to generate a filtered gradient magnitude value and normalizing the filtered gradient magnitude value using a nonlinear normalization equation.

As an example, a system can include a processor; memory operatively coupled to the processor; and modules stored in the memory that comprise processor-executable instructions to instruct the system to access data values for a region; determine gradient magnitude values based on at least a portion of the data values; normalize each of the gradient magnitude values using a nonlinear normalization equation that includes a gradient magnitude variable divided by a normalization variable raised to a power that depends on an adjustable parameter; and output the normalized gradient magnitude values.

As an example, a system can include a processor; memory operatively coupled to the processor; and modules stored in the memory that comprise processor-executable instructions to instruct the system to access seismic data values for a subsurface region that includes a reflector; determine gradient magnitude values based on at least a portion of the seismic data values; normalize each of the gradient magnitude values using a nonlinear normalization equation that includes a gradient magnitude variable divided by a normalization variable raised to a power that depends on an adjustable parameter; and output the normalized gradient magnitude values. In such an example, the normalization variable may be one of the seismic data values used for determining a corresponding one of the gradient magnitude values. As an example, a normalization variable may be a largest magnitude seismic data value of seismic data values used for determining a corresponding gradient magnitude value.

As an example, a system may include a module or modules that include processor-executable instructions to instruct the system to apply a mean filter to gradient magnitude values to generate filtered gradient magnitude values and to normalize the filtered gradient magnitude values using a nonlinear normalization equation.

As an example, one or more computer-readable storage media can include processor-executable instructions to instruct a computing device to: access data values for a region; determine gradient magnitude values based on at least a portion of the data values; normalize each of the gradient magnitude values using a nonlinear normalization equation that includes a gradient magnitude variable divided by a normalization variable raised to a power that depends on an adjustable parameter; and output the normalized gradient magnitude values As an example, one or more computer-readable storage media can include processor-executable instructions to instruct a computing device to: access seismic data values for a subsurface region that includes a reflector; determine gradient magnitude values based on at least a portion of the seismic data values; normalize each of the gradient magnitude values using a nonlinear normalization equation that includes a gradient magnitude variable divided by a normalization variable raised to a power that depends on an adjustable parameter; and output the normalized gradient magnitude values. In such an example, the normalization variable may be one of the seismic data values used for determining a corresponding one of the gradient magnitude values. As an example, a normalization variable may be a largest magnitude seismic data value of seismic data values used for determining a corresponding gradient magnitude value.

Figure 7:
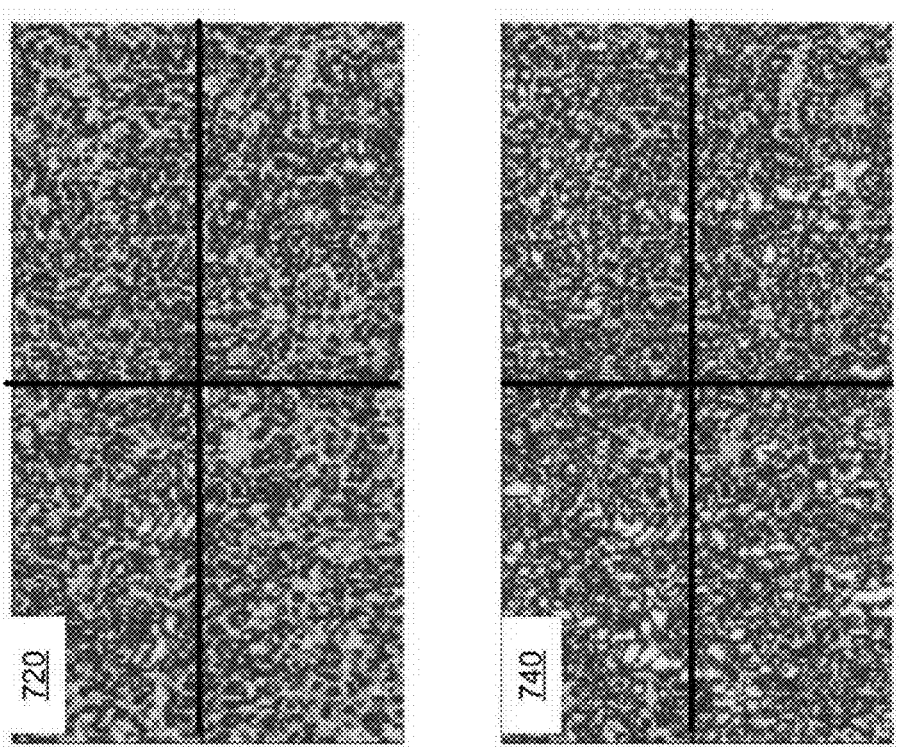
FIG. 7 illustrates examples of data and processed data.
Figure 7:
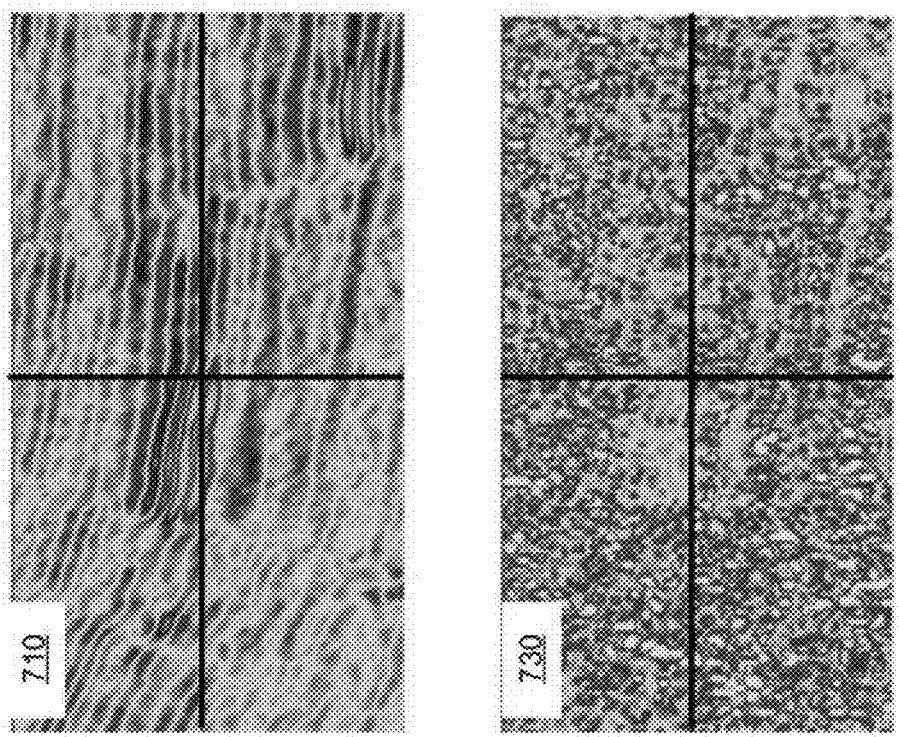

FIG. 7 shows input data values 710 and processed data values 720, 730 and 740. The input data values 710 include seismic inline data values, the processed data values 720 include lateral derivative values in the inline direction without normalization (e.g., k large), the processed data values 730 include lateral derivative values in the inline direction normalized (e.g., k=1) and the processed data values 740 include lateral derivative values in the inline direction normalized (e.g., k=2).

As an example, low-amplitude reflectors may have low-amplitude gradients (e.g., a relatively large change in a small value range remains a small value). Referring to the processed data values 720, where lateral changes in the strong reflector near center (e.g., location indicated by the cross-hairs) stand out, however, a fault to the far left (e.g., surrounded by weak reflectors) is less visible. As an example, to make edge-detection insensitive to reflector amplitude, a method can include normalizing the spatial derivatives by the magnitude of the seismic amplitudes.

Referring to the processed data values 730, the lateral derivative values in the inline direction are normalized by the magnitude (i.e., absolute value) of the lateral derivative with the factor $|I|^{(1/1)}=|I|$, where I is the amplitude of the seismic data value at the location for which the derivative is determined (e.g., a centered spatial location). As seen in FIG. 7, the fault to the left in the image is highlighted, while lateral changes for the strong reflector are more muted.

As an example, a method may include highlighting lateral changes for both the strong and the weak reflectors simultaneously in the seismic data values 710. Referring to the processed data values 740, normalization may use, as an example, the term $|I|^{(1/2)}=Sqrt(|I|)$, which provides for highlighting changes in both the strong and the weak reflectors.

As an example, a method can include normalizing a gradient value (e.g., gradient magnitude, etc.) using a term $I^{(1/k)}$. For example, a method can include normalizing the lateral derivative of seismic data values with the term $|I|^{(1/k)}$, where k is a number (e.g., integer, fraction, rational, complex, etc.) and where $|I|$ is a positive value, for example, representative of a value range of numbers used to calculate a derivative or derivatives (e.g. center value, mean value, max value, etc.).

Figure 8:
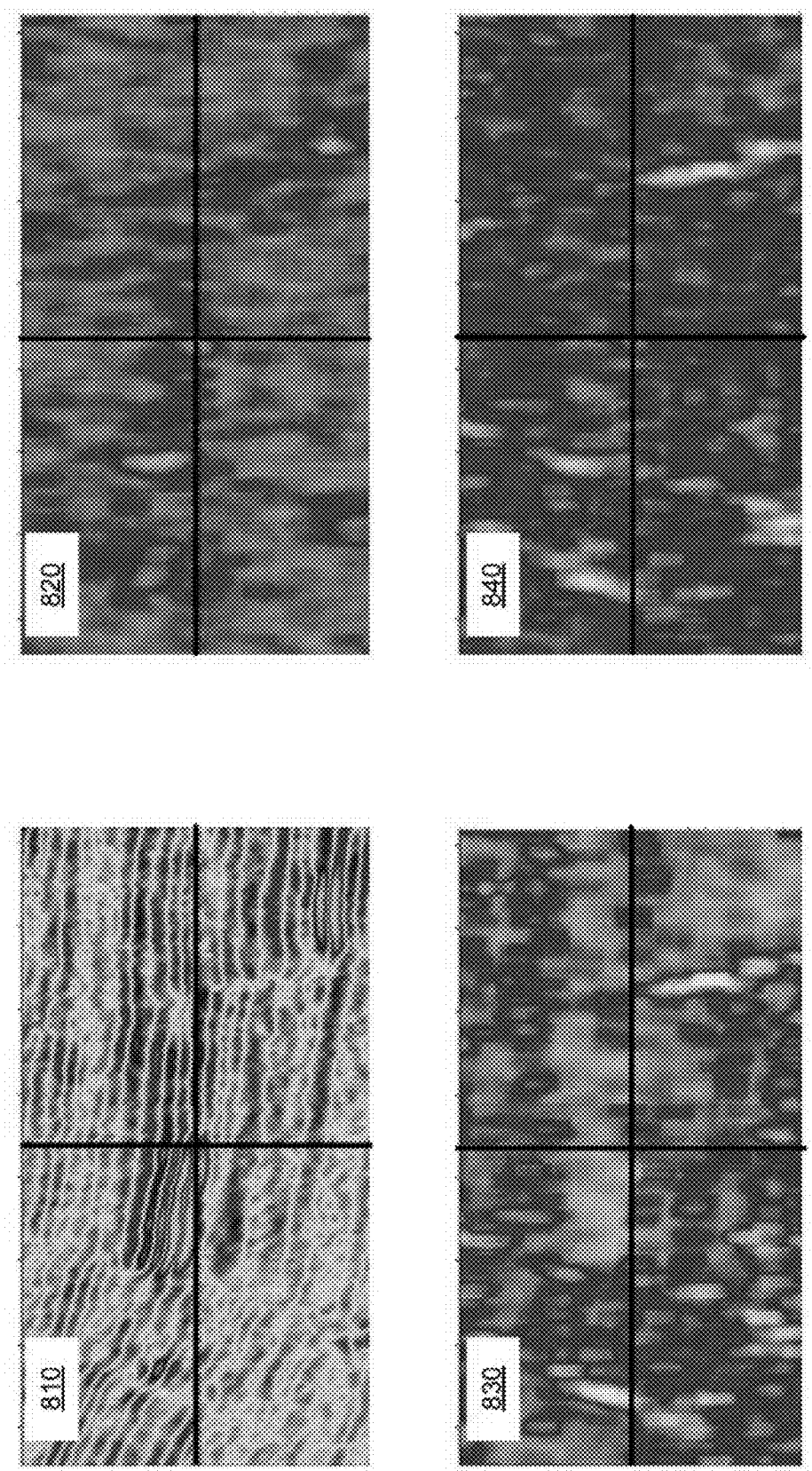
FIG. 8 illustrates examples of data and processed data.

FIG. 8 shows input data values 810 and processed data values 820, 830 and 840. The input data values 810 correspond to those of 710, however, the processed data values 820, 830 and 840 are values generated, for example, by application of a 3×9 sample mean filter to the normalized lateral derivatives. As demonstrated in FIG. 8, such a mean filter can enhance vertical continuity of the fault planes and attenuate random noise. Referring to the processed data values 840, (normalization factor k=2, i.e. Sqrt(|I|)), a balanced "blend" is generated, for example, of the results per the processed data values 820 and 830, which, in this example, yields a better overall continuity of the fault planes. In the examples of FIG. 7 and FIG. 8, the color scales include different minimum and maximum values, for example, due to use of different normalization terms.

Figure 9:
FIG. 9 illustrates examples of data and processed data.
Figure 9:
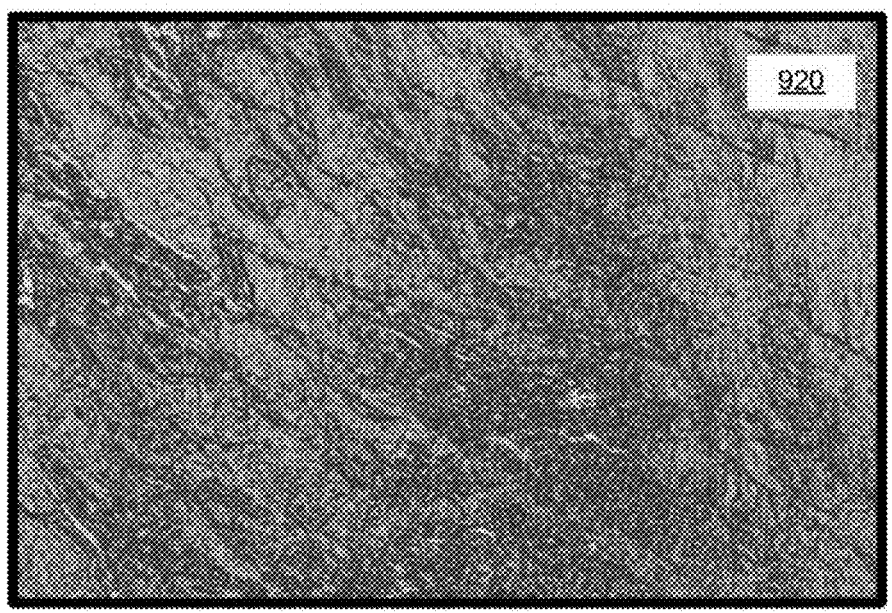
Figure 10:
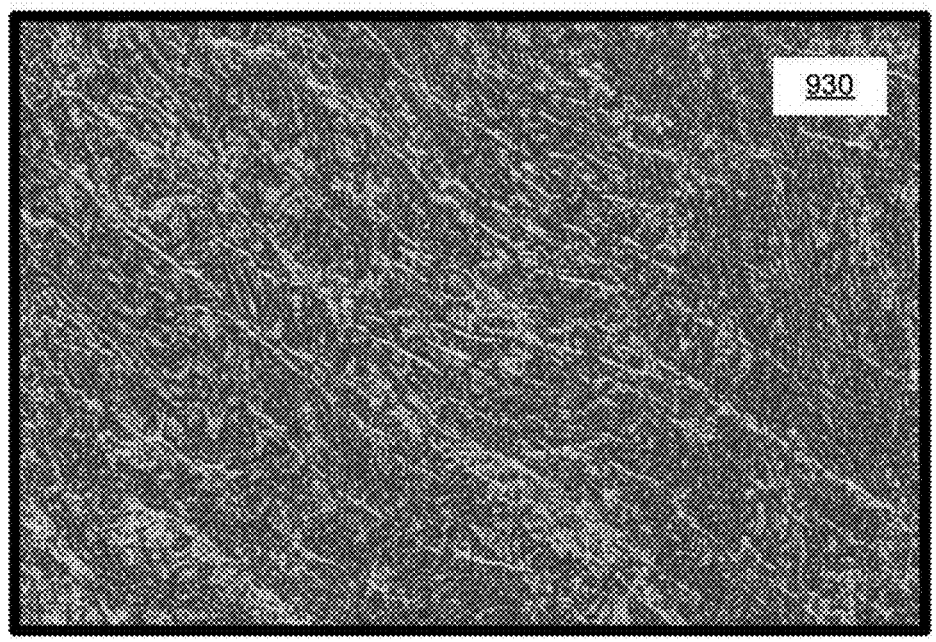
FIG. 10 illustrates examples of processed data.
Figure 10:
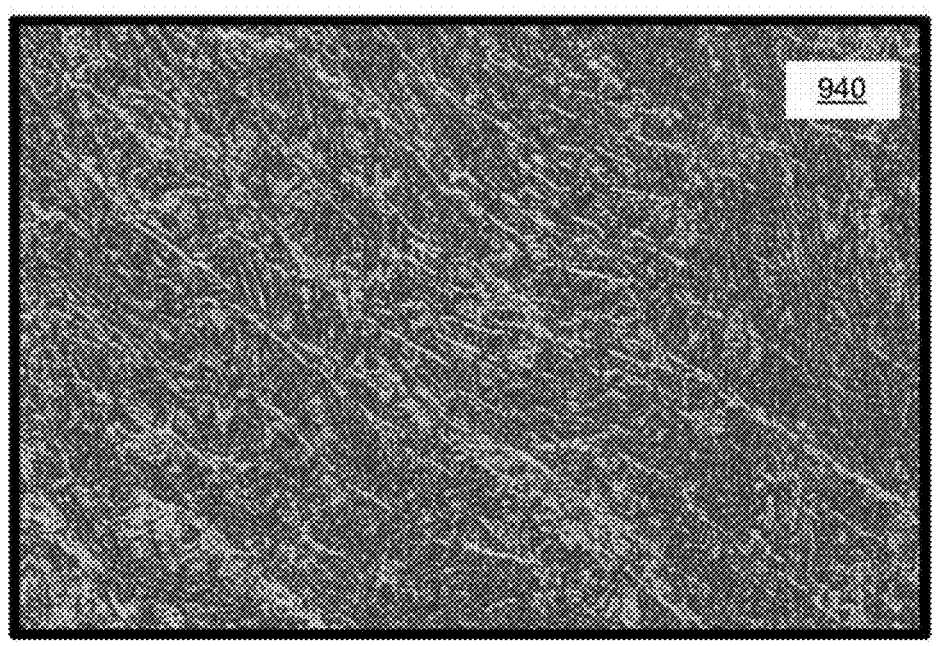
Figure 11:
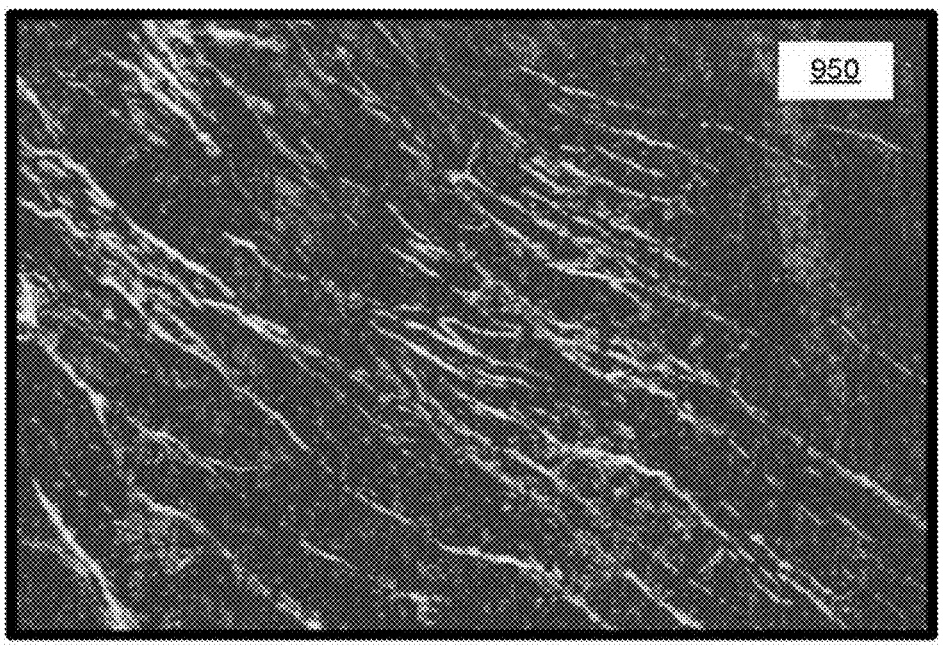
FIG. 11 illustrates examples of processed data.
Figure 11:

FIGS. 9, 10 and 11 show example seismic data values 919 and example processed seismic data values 920, 930, 940, 950 and 960. The seismic data values 910 correspond to a horizontal time-slice through a representative 3D seismic cube (e.g., a seismic data volume). The data values were processed to provide magnitude of the spatial derivatives in the x and y directions and to then determine the RMS sum of those derivatives, which yielded the processed seismic data values 920.

Referring to the processed seismic data values 920, strong reflectors can more strongly indicate the presence of a fault than the weak reflectors. As an example, a method may include correcting for under-estimation of edges for weak reflectors. In such a method, normalization may be applied. For example, a normalization factor may aim to represent the strength of the reflectors, for example, using amplitude magnitude for center pixel used in the gradient calculation, amplitude magnitude for strongest pixel used in the gradient calculation, mean amplitude magnitude for considered pixel values, RMS or mean amplitude magnitude in a spatial window in the proximity of the center pixel. Of these examples, amplitude magnitude finds use, for example, in determination of coherency, variance and amplitude contrast seismic attributes. However, when such an approach is applied, for very weak reflectors, it can be unstable because of risk of division-by-zero.

As an example, a method may include normalizing based at leas in part on an amplitude magnitude for a strongest pixel used in a gradient determination. For example, referring to FIG. 4, the maximum amplitude magnitude for the gradient determinations 420 and 430 is "255" (e.g., greatest intensity of the three in an x-direction kernel or a y-direction kernel).

Referring to FIG. 10 and processed seismic data values 930, these result from normalization using the strongest seismic data value within a gradient determination kernel (e.g., or kernels). As shown, edges for weak reflectors are now more visible and, overall, the result appears intuitively better than for the processed seismic data values 920 of FIG. 9.

As an example, consider that a normalization proportional to the amplitude/energy level of the reflectors at hand may tend to under-estimate the presence of discontinuities for strong reflectors. Such a tendency finds support in practical and empirical aspects as to the nature of seismic reflections. Accordingly, as an example, depending on what may be desired from an investigation (e.g., a workflow), a smaller norm may be appropriate for strong reflectors than for weak reflectors.

As an example, consider seismic waves propagating through the underground to be measured by pressure sensors or accelerometers. Both of these types of sensors measure the energy level of the propagating acoustic and elastic wave propagation, not the magnitude (amplitude) of the waves. Amplitude may be considered to be proportional to the square root of energy and energy of seismic signals can tend to be proportional to the square of amplitude. Given such considerations, a norm proportional to the square root of recorded energy level may be appropriate, for example, depending on desired outcome (e.g., of a workflow, etc.). Thus, as an example, a strong reflector may have a comparatively smaller norm than a weak reflector where the square root of the norm is used to scale gradient values.

As an example, for a two-dimensional scenario, the following equation may be provided:

$$Result(x,y)=Sqrt(dIx*dIx+dIy*dIy)/norm^{(1/k)}$$

in the foregoing example equation, dIx may represent the spatial derivative of an image (e.g., for the point (x,y)) in the x direction, and dIy may represent the spatial derivative of the image (e.g., for the point (x,y)) in the y direction. As an example, the norm value may be a representative value of the strength of the data, the pixel, the voxel, the sample, etc. and k may be a predefined value or, for example, a user-defined value (e.g., optionally a constant). As an example, a method may include a default setting for the parameter k, for example, k is set to be equal to 2 (e.g., to take the square root of the norm as the actual norm used).

In FIG. 10, the processed data values 940 correspond to k=2 and a comparison can be made to the processed data values 930, where no modified norm is used. From such a comparison, strong reflectors can have a much more pronounced edge indication, while the more noisy parts of the weak reflectors have been somewhat muted, which may be deemed a desirable result.

As an example, a seismic edge detection process may include computing spatial derivatives along an estimated local 3D layering (e.g., dip correction) and also adding an element of vertical smoothing, for example, to help ensure continuity in the vertical (depth domain) dimension. Where these two techniques are applied (e.g., dip correction and vertical smoothing), one arrives at the processed seismic data 950 of FIG. 11. The processed seismic data 950 of FIG. 11 corresponds to the processed seismic data 940 of FIG. 10 with dip-corrected spatial derivatives and vertical smoothing (e.g., with a radius of two samples in the vertical dimension).

In FIG. 11, the processed seismic data 960 corresponds to a comparable horizontal section (time-slice) result using the variance seismic attribute (parameters=3, 3, 7) in the PETREL® framework.

Figure 12:
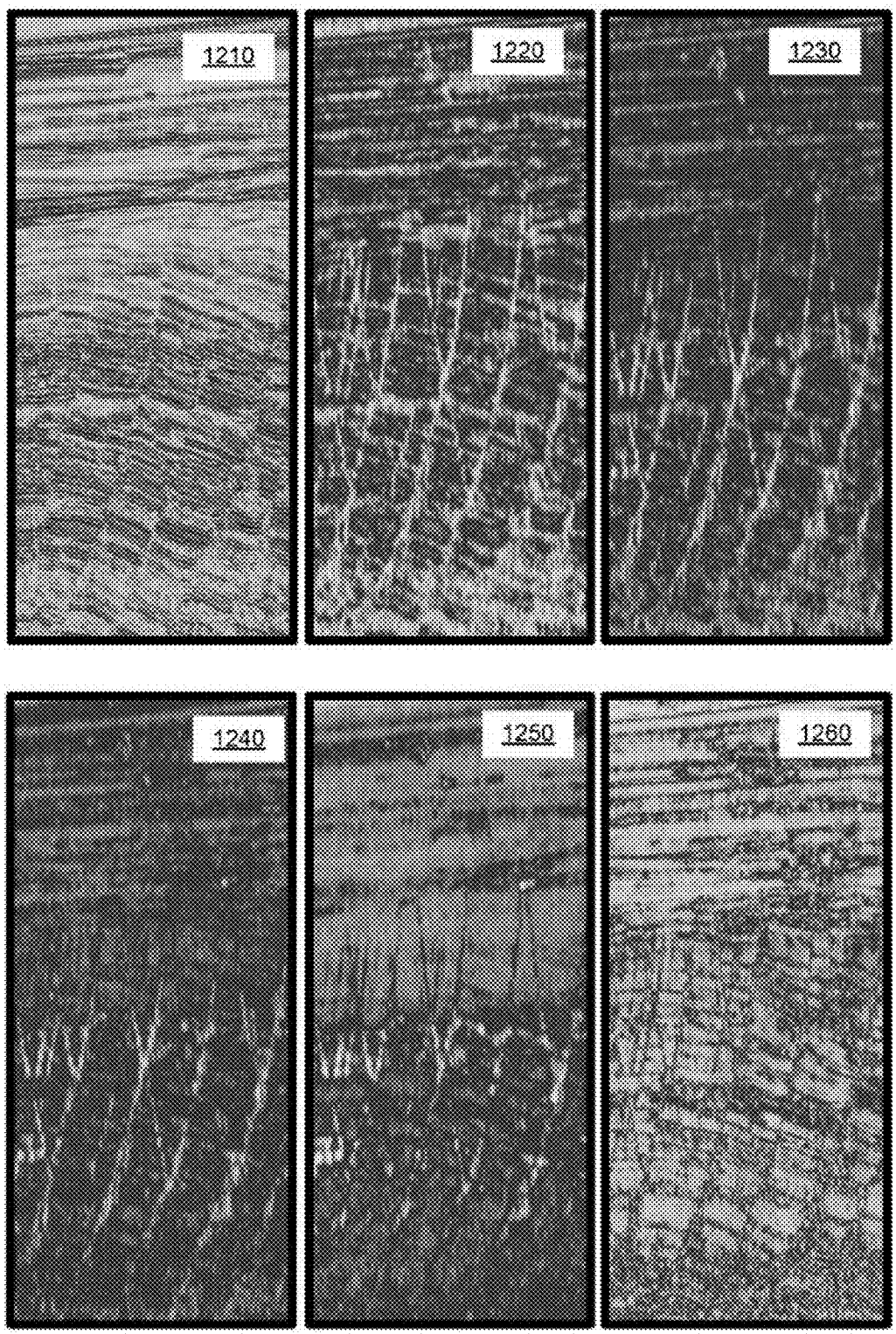
FIG. 12 illustrates examples of data and processed data.

FIG. 12 shows examples of input seismic data 1210 and processed seismic data 1220, 1230, 1240, 1250 and 1260. The input seismic data 1210 corresponds to an inline seismic section.

The processed seismic data 1220 corresponds to normalized edge result, using k=1. As seen in FIG. 12, many small discontinuities exist throughout the processed seismic data 1220; noting that for k=1, results are sensitive to low-amplitude noise.

The processed seismic data 1230 correspond to a normalized edge result, using k=1.5: and the processed seismic data 1240 corresponds to a normalized edge result, using k=2 (i.e. squared normalization).

The processed seismic data 1250 correspond to a normalized edge result, using k=99 (e.g., normalization approximately unity), which means that practically no amplitude correction is applied. As such, strong reflectors can dominate the result; noting that some faults are well-mapped for this k value.

The processed seismic data 1260 correspond to a comparable vertical section (inline) result using the variance seismic attribute (parameters=3, 3, 7) in the PETREL® framework.

Figure 13:
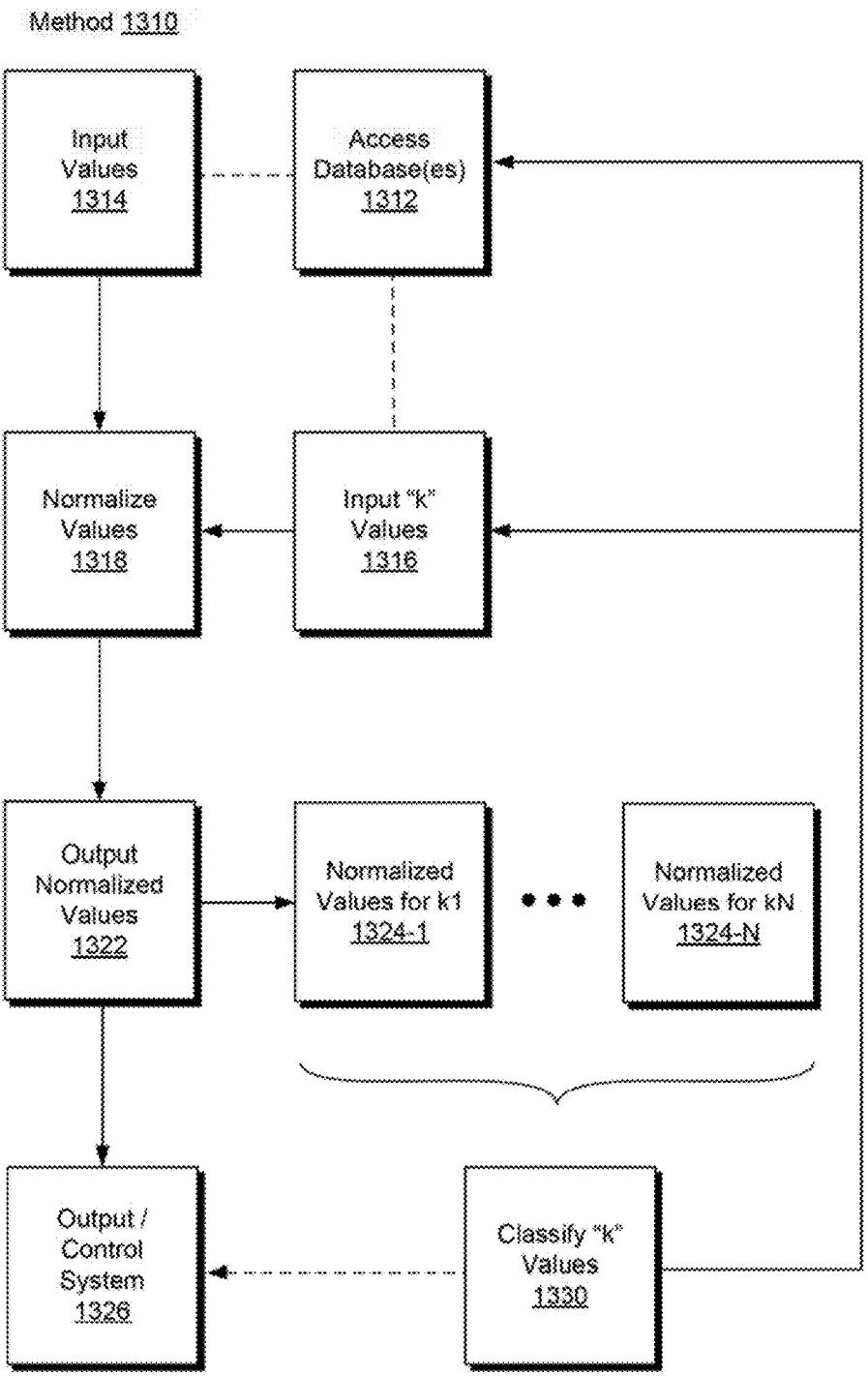
FIG. 13 illustrates an example of a method.

FIG. 13 shows an example of a method 1310 that includes an access block 1312 for accessing one or more databases (e.g., data stores, data storage devices, etc.), an input block 1314 for inputting values (e.g., optionally accessed via the access block 1312), an input block 1316 for inputting parameter (k) values (e.g., optionally accessed via the access block 1312) a normalization block 1318 for normalizing input values based at least in part on the parameter (k) values, an output block 1322 for outputting normalized values for each of the various parameter (k) values (see, e.g., outputs 1324-1 to 1324-N), an output and/or control block 1326 for outputting information to and/or controlling a system. As shown in the example of FIG. 13, the method 1310 may include a classification block 1330, for example, to classify parameter (k) values, optionally for purposes of storing the parameter (k) values with respect to a class in a database, providing particular parameter (k) values as input and/or outputting and/or controlling a system based at least in part on a classification or classifications. For example, where a parameter (k) value is classified as to fractures that may be artificial fractures, information may be output to a field site or other operational site for purposes of further fracturing (e.g., injecting, etc.).

As an example, the method 1310 may include a process block for processing such as ant-tracking. For example, where particular structural features are highlighted in output results using one or more of the parameter (k) values, ant-tracking may be applied to those results. Such an approach may facilitate determination of locations of structures that may be indicated by weak reflectors, strong reflectors or weak and strong reflectors in seismic data values (e.g., from a seismic study of a subterranean environment).

As an example, a Radon transform may be applied by a process block, for example, for purposes of line extraction (e.g., edge detection). As an example, a method may include detecting faults that stem from old earthquakes, oil accumulations, artificial fracturing (e.g., hydraulic fracturing), etc. As an example, a method may include detecting features and mapping such feature prior to drilling, for example, to avoid drilling through active faults. For example, a method such as the method 1310 may be implemented to uncover and/or highlight active faults.

As an example, a method may include tracking changes in a subterranean environment with respect to time. For example, changes may be due to artificial fractures, sedimentation as to depletion of a reservoir, etc. Such a method may include assessing different generations of seismic data, one data, another data set, etc. and examining processed data for differences (e.g. as an indication of a response to pressure, production, injection, etc.).

As an example, a system may include one or more modules, which may be provided to analyze data, control a process, perform a task, perform a workstep, perform a workflow, etc.

Figure 14:
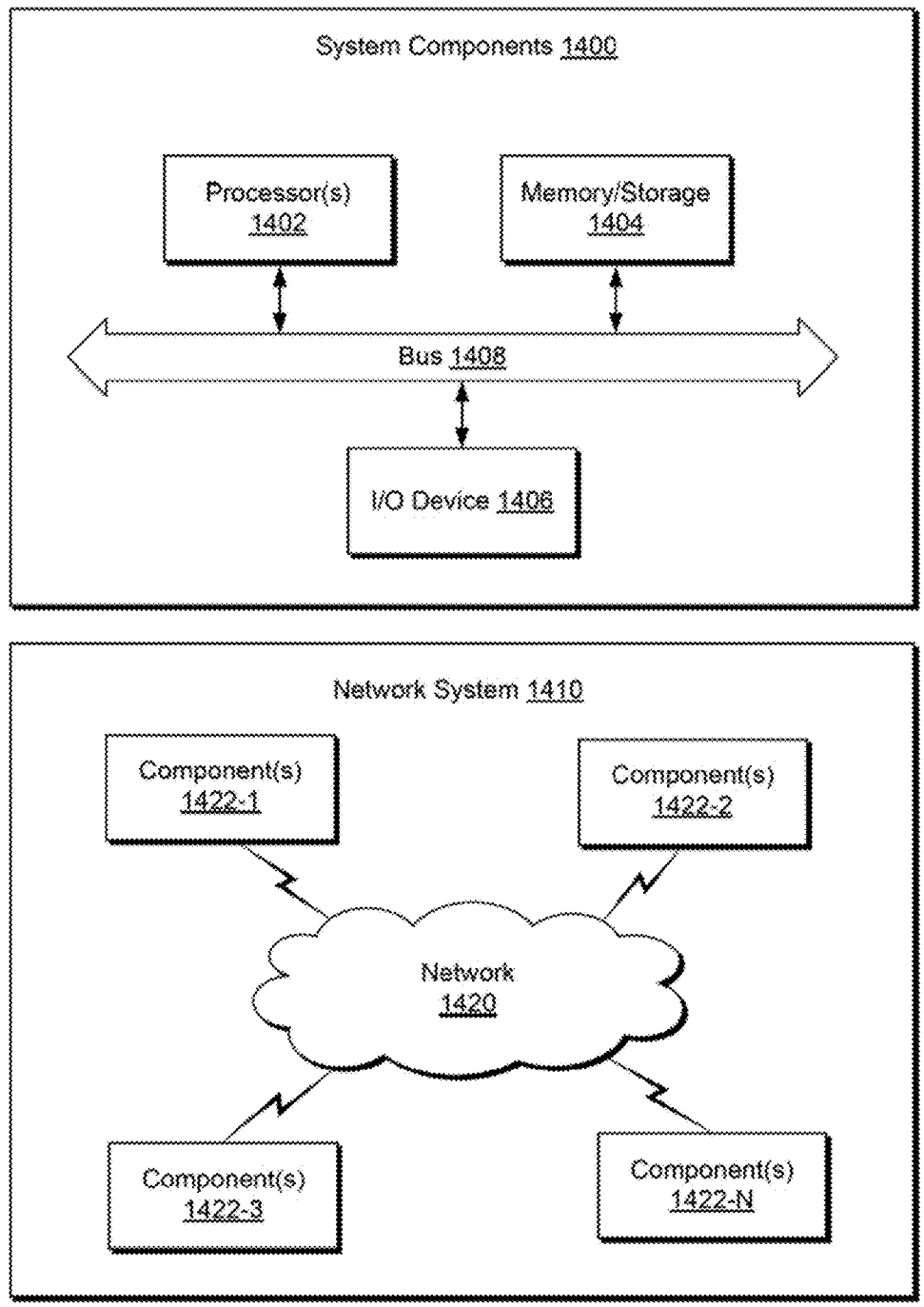
FIG. 14 illustrates example components of a system and a networked system.

FIG. 14 shows components of an example of a computing system 1400 and an example of a networked system 1410.

The system 1400 includes one or more processors 1402, memory and/or storage components 1404, one or more input and/or output devices 1406 and a bus 1408. In an example embodiment, instructions may be stored in one or more computer-readable media (e.g., memory/storage components 1404). Such instructions may be read by one or more processors (e.g., the processor(s) 1402) via a communication bus (e.g., the bus 1408), which may be wired or wireless. The one or more processors may execute such instructions to implement (wholly or in part) one or more attributes (e.g., as part of a method). A user may view output from and interact with a process via an I/O device (e.g., the device 1406). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1410. The network system 1410 includes components 1422-1, 1422-2, 1422-3, ... 1422-N. For example, the components 1422-1 may include the processor(s) 1402 while the component(s) 1422-3 may include memory accessible by the processor(s) 1402. Further, the component(s) 1402-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. A method comprising:
   receiving imagery data values for a region;
   determining a gradient magnitude value based on at least a portion of the data values;
   normalizing the gradient magnitude value using a nonlinear normalization equation that comprises a gradient magnitude variable divided by a normalization variable raised to a power that depends on an adjustable parameter k wherein the power is $k^{-1}$ and wherein k is a rational number greater than one; and
   outputting to a display an edge enhanced image that is based at least in part on the normalized gradient magnitude value.

2. The method of claim 1 wherein the data values for a region comprise seismic data values for a subsurface region that comprises a reflector.

3. The method of claim 1 wherein the power is a number greater than or equal to approximately 2.

4. The method of claim 1 wherein the normalization variable comprises one of the data values used for determining the gradient magnitude value.

5. The method of claim 1 wherein the normalization variable comprises the largest magnitude data value of the data values used for determining the gradient magnitude value.

6. The method of claim 2 wherein the subsurface region comprises reflectors wherein the reflectors comprise different classes of reflectors.

7. The method of claim 6 wherein the adjustable parameter is selected based at least in part on one of the different classes of reflectors.

8. The method of claim 1 further comprising performing the normalizing using a computing device.

9. The method of claim 1 further comprising repeating the determining, the normalizing and the outputting to generate a multi-dimensional set of normalized gradient values.

10. The method of claim 9 further comprising performing ant-tracking on the multi-dimensional set of normalized gradient values.

11. The method of claim 1 further comprising determining a set of gradient magnitude values, applying a mean filter to the set of gradient magnitude values to generate a filtered gradient magnitude value and normalizing the filtered gradient magnitude value using the nonlinear normalization equation.

12. A system comprising:
a processor;
memory operatively coupled to the processor;
modules stored in the memory that comprise processor-executable instructions to instruct the system to
access imagery data values for a region;
determine gradient magnitude values based on at least a portion of the data values;
normalize each of the gradient magnitude values using a nonlinear normalization equation that comprises a gradient magnitude variable divided by a normalization variable raised to a power that depends on an adjustable parameter k wherein the power is $k^{-1}$ and wherein k is a rational number greater than one; and
output to a display an edge enhanced image that is based at least in part on the normalized gradient magnitude values.

13. The system of claim 12 wherein the imagery data values comprise seismic data values and wherein the normalization variable comprises one of the seismic data values used for determining a corresponding one of the gradient magnitude values.

14. The system of claim 12 wherein the imagery data values comprise seismic data values and wherein the normalization variable comprises the largest magnitude seismic data value of the seismic data values used for determining a corresponding gradient magnitude value.

15. The system of claim 12 wherein the modules comprise processor-executable instructions to instruct the system to apply a mean filter to the gradient magnitude values to generate filtered gradient magnitude values and to normalize the filtered gradient magnitude values using the nonlinear normalization equation.

16. One or more computer-readable storage media comprising processor-executable instructions to instruct a computing device to:
access imagery data values for a region;
determine gradient magnitude values based on at least a portion of the seismic data values;
normalize each of the gradient magnitude values using a nonlinear normalization equation that comprises a gradient magnitude variable divided by a normalization variable raised to a power that depends on an adjustable parameter k wherein the power is $k^{-1}$ and wherein k is a rational number greater than one; and
output to a display an edge enhanced image that is based at least in part on the normalized gradient magnitude values.

17. The one or more computer-readable storage media of claim 16 wherein the imagery data values comprise seismic data values and wherein the normalization variable comprises one of the seismic data values used for determining a corresponding one of the gradient magnitude values.

18. The one or more computer-readable storage media of claim 16 wherein the imagery data values comprise seismic data values and wherein the normalization variable comprises the largest magnitude seismic data value of the seismic data values used for determining a corresponding gradient magnitude value.

* * * * *